US010451007B1

(12) United States Patent
Elia

(10) Patent No.: US 10,451,007 B1
(45) Date of Patent: Oct. 22, 2019

(54) ENHANCED OPERABILITY DUAL MODE RAMJET AND SCRAMJET ENGINE IGNITION SYSTEM

(71) Applicant: Shareil Elia, Long Beach, CA (US)

(72) Inventor: Shareil Elia, Long Beach, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 255 days.

(21) Appl. No.: 15/438,274

(22) Filed: Feb. 21, 2017

(51) Int. Cl.
*F02K 1/00* (2006.01)
*F02K 9/95* (2006.01)
*F02K 9/24* (2006.01)

(52) U.S. Cl.
CPC . *F02K 9/95* (2013.01); *F02K 9/24* (2013.01)

(58) Field of Classification Search
CPC ..... F02K 9/95; F02K 9/24; F02K 9/78; F02K 9/94; F02K 7/18; F02K 7/14; F02K 7/16; F02C 7/26; F05D 2220/10; F05D 2260/85
See application file for complete search history.

(56) References Cited

U.S. PATENT DOCUMENTS

| 2,959,007 | A |   | 11/1960 | Gregory et al. |   |
|---|---|---|---|---|---|
| 3,777,488 | A | * | 12/1973 | Gross | F02K 7/10 244/53 B |
| 6,250,072 | B1 |   | 6/2001 | Jacobson et al. |   |
| 2007/0175222 | A1 | * | 8/2007 | Donohue | F02K 7/10 60/767 |
| 2009/0205311 | A1 | * | 8/2009 | Bulman | F02K 7/10 60/219 |
| 2013/0097995 | A1 | * | 4/2013 | Schroeder | F02K 9/94 60/219 |

* cited by examiner

*Primary Examiner* — Craig Kim
*Assistant Examiner* — Edwin Kang
(74) *Attorney, Agent, or Firm* — Tarolli, Sundheim, Covell & Tummino LLP

(57) ABSTRACT

An ignition system for a jet includes a squib. A solid propellant gas generator is ignitable by the squib and produces hot gas. An insulated hot gas accumulator is provided for storing the hot gas. A three-way hot gas valve is in fluid communication with the jet, the solid propellant gas generator, and the insulated hot gas accumulator. The three-way hot gas valve has a first condition establishing a first flow path from the solid propellant gas generator to the jet, a second condition establishing a second flow path from the solid propellant gas generator to the insulated hot gas accumulator, and a third condition establishing a third flow path from the insulated hot gas accumulator to the jet.

16 Claims, 3 Drawing Sheets

_US 10,451,007 B1_

ENHANCED OPERABILITY DUAL MODE RAMJET AND SCRAMJET ENGINE IGNITION SYSTEM

TECHNICAL FIELD

This disclosure relates to an apparatus and method for igniting a jet engine and, more particularly, to an enhanced operability ignition system for dual mode ramjet and scramjet engines with multiple relight capability.

BACKGROUND

Dual mode ramjet and scramjet engines can be used to propel an air vehicle at hypersonic speeds exceeding mach 5. For rocket-boosted dual mode ramjet and scramjet engine powered vehicles, an ignition system is required to deliver an initial energy source to induce combustion when operational conditions are not conducive to auto-ignition of the fuel/air mixture at take over condition. Additionally, a separate fuel source is typically needed for hydrocarbon-fueled dual mode ramjet and scramjet engines during "cold-start" when the main endothermic fuel is not at a temperature that can sustain combustion due to the fact that the engine flow path is not yet heated. Transitioning from the cold-start fuel to the primary endothermic fuel presents challenges to the design of propulsion systems, as the cold-start fuel and the main fuel each have different attributes in regard to ignition delay time, blowout, and heat release profile. The differences in these attributes result in unique engine/vehicle operational characteristics depending on whether the cold-start fuel or main fuel is being used, and vehicle control systems should be capable of addressing the transition from cold-start fuel to the main fuel.

Presently, dual mode ramjet and scramjet engine designs rely on a single-use pyrotechnic device, a plasma torch, or a spark igniter to generate the elevated temperatures and pool of radicals that are needed to ignite the fuel and air mixture. The single-use pyrotechnic device offers a single opportunity to start the engine. This can be problematic, as it may be difficult to restart the engine should the engine experience blowout or unstart during operation once the single-use pyrotechnic has been exhausted. The plasma torch and spark ignition systems, although theoretically capable of offering multiple restarts, undesirably require large electrical energy input to be effective.

Although multiple restart systems for dual mode ramjet and scramjet engines have been contemplated utilizing multiple single-use pyrotechnic igniters or plasma torches, both of these arrangements are undesirable for several reasons. Namely, the multiple single-use igniters and plasma torches undesirably add complexity, weight, cost, and power requirements to a vehicle while also requiring a separate cold-start system. Therefore, what is needed is a system that provides multiple restart capabilities to dual mode ramjet and scramjet engines while eliminating a need for a separate cold-start fuel system and also addressing the aforementioned transition challenges.

SUMMARY

In an embodiment, an ignition system for an engine is described. The ignition system includes an ignition source for producing hot gas. An accumulator is provided for storing the hot gas. A valve is in fluid communication with the engine, the ignition source, and the accumulator. The valve is arranged to selectively direct the hot gas between the engine and the accumulator.

In an embodiment, a method of igniting a jet engine is described. An ignition source is activated to produce hot gas. The hot gas is used to ignite the jet engine. Residual hot gas is stored after ignition of the jet engine.

In an embodiment, an ignition system for a jet is described. The ignition system includes a squib. A solid propellant gas generator is ignitable by the squib and produces hot gas. An insulated hot gas accumulator is provided for storing the hot gas. A three-way hot gas valve is in fluid communication with the jet, the solid propellant gas generator, and the insulated hot gas accumulator. The three-way hot gas valve has a first condition establishing a first flow path from the solid propellant gas generator to the jet, a second condition establishing a second flow path from the solid propellant gas generator to the insulated hot gas accumulator, and a third condition establishing a third flow path from the insulated hot gas accumulator to the jet.

BRIEF DESCRIPTION OF THE DRAWINGS

For a better understanding, reference may be made to the accompanying drawings, in which.

DESCRIPTION OF ASPECTS OF THE DISCLOSURE

The present invention overcomes the above discussed problems associated with known single-use pyrotechnic engine starters by providing an apparatus that enables multiple restarts of a dual mode ramjet or scramjet engine while minimizing any increase in complexity, weight, cost, and power requirements. Additionally, the present invention eliminates the need for a separate cold-start system. The present invention facilitates multiple restarts by capturing and storing hot gas generated by a hot gas generator after the dual mode ramjet or scramjet engine is initially started. Hot exhaust gas from the hot gas generator is used to evaporate the liquid endothermic hydrocarbon fuel and atomize the liquid endothermic hydrocarbon fuel for mixing and combustion, thereby eliminating reliance on a separate cold-start system. Should the dual mode ramjet or scramjet engine experience blowout or unstart during operation, the present invention can provide reliable multiple restart capabilities of the engine by diverting a desired amount of stored hot radical rich exhaust gas to the engine until engine restart is achieved. To further enhance engine operability, the stored exhaust gas can also be injected in a strategic location in the cavity flame holder of the engine and after combustion when the engine is susceptible to lean blowout.

Figure 1:
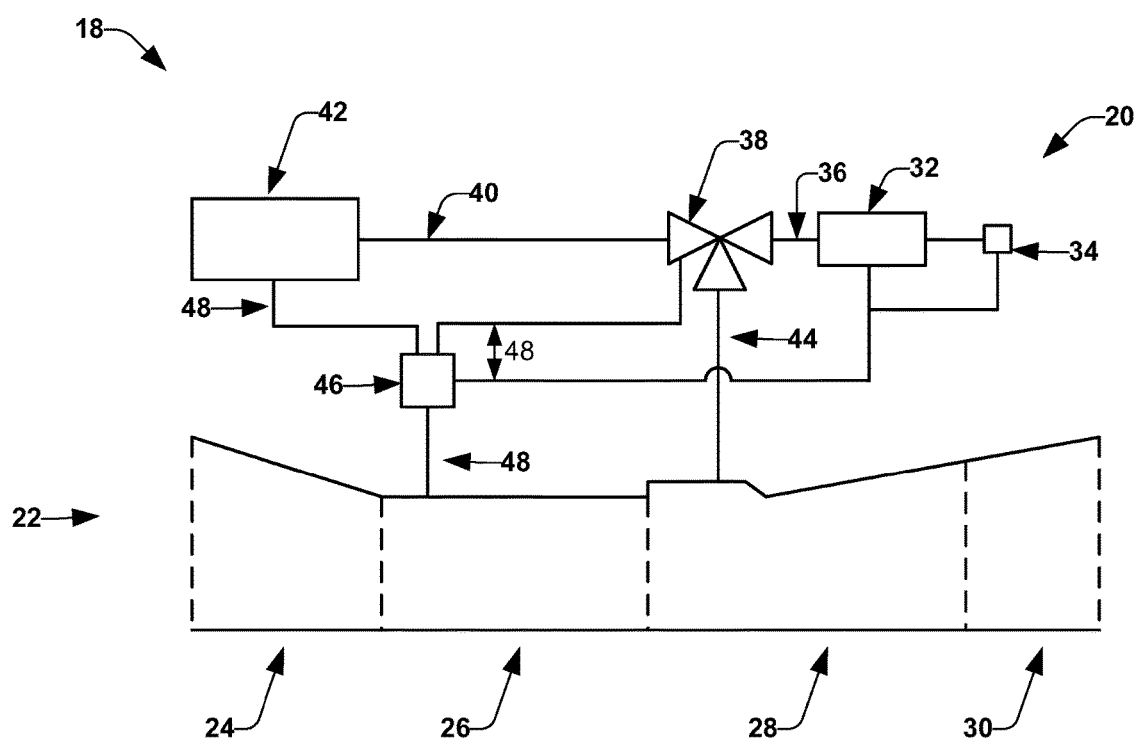
FIG. 1 is a schematic view of one aspect of the invention.
Figure 3:
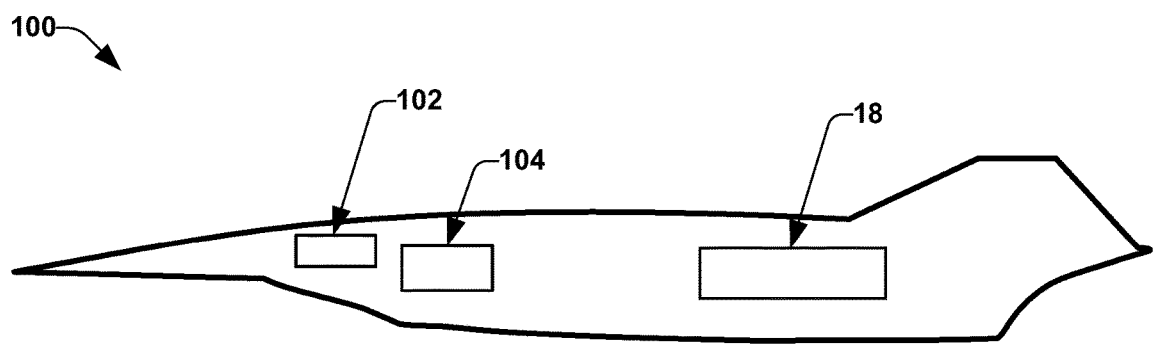
FIG. 3 is an example aircraft having the aspect of FIG. 1.

FIG. 1 depicts an apparatus, shown here as a propulsion unit 18, which can be used to propel a vehicle. In one example, the vehicle is an aircraft 100 (see FIG. 3). The vehicle can be any other type, for example, a wheeled land vehicle. The aircraft 100 can be an unmanned vehicle controlled by a computer 102. The aircraft 100 can also be a manned vehicle having a compartment 104 for a pilot and/or a passenger.

The propulsion unit 18 includes an ignition system 20 and an engine 22. In one example, the engine 22 is a scramjet.

The engine 22 can be any other type, for example, a dual mode ramjet. The engine 22 will be described herein as a scramjet 22.

The scramjet 22 includes an inlet 24, an isolator 26, a combustor 28, and a nozzle 30. In operation, the forward motion of the aircraft 100 on which the scramjet 22 is provided forces air containing atmospheric oxygen into the inlet 24. The inlet 24 compresses the incoming air, which then flows past the isolator 26 and into the combustor 28. In the combustor 28, fuel is introduced and burned with the atmospheric oxygen from the compressed incoming air to generate heated air. The nozzle 30 accelerates the heated air to create thrust that propels the aircraft 100.

The ignition system 20 can provide an initial ignition source for the fuel and air mixture in the combustor 28 during cold start of the scramjet 22. The ignition system 20 includes a gas generator 32 and a squib 34 for igniting the gas generator 32. The gas generator 32 can be a solid propellant gas generator. The gas generator 32 can be ignited to generate hot gas that can be used to evaporate, atomize, and ignite the fuel and air mixture in the combustor 28. A first conduit 36 fluidly couples the gas generator 32 to a valve 38. The valve 38 can be a three-way hot gas valve. A second conduit 40 and a third conduit 44 fluidly couple the valve 38 to an accumulator 42 and to the combustor 28, respectively. The accumulator 42 can be a thermally insulated hot gas accumulator. A controller 46 is provided for controlling and/or monitoring the scramjet 22, the squib 34, the gas generator 32, the valve 38, and the accumulator 42, via respective communication lines 48.

The valve 38 has a first condition, a second condition, and a third condition. In the first condition, the valve 38 establishes a first flow path from the gas generator 32 to the combustor 28. The first flow path is at least partly defined by the first conduit 36, the valve 38, and the third conduit 44. In the second condition, the valve 38 establishes a second flow path from the gas generator 32 to the accumulator 42. The second flow path is at least partly defined by the first conduit 36, the valve 38, and the second conduit 40. In the third condition, the valve 38 establishes a third flow path from the accumulator 42 to the combustor 28. The third flow path is at least partly defined by the second conduit 40, the valve 38, and the third conduit 44.

Figure 2:
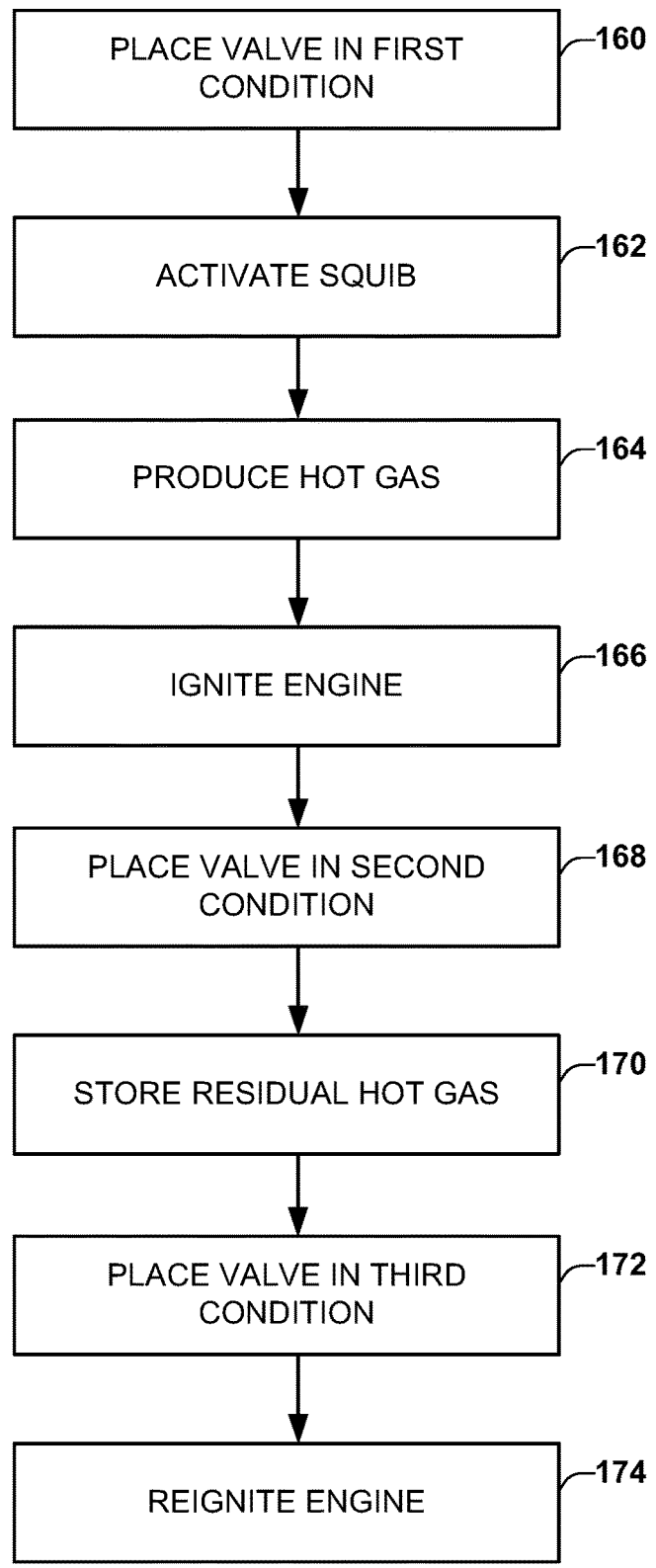
FIG. 2 schematically depicts an example sequence of operation of the aspect of FIG. 1.

Referring to FIG. 2, an example sequence of operation for the propulsion unit 18 of FIG. 1 is shown. At 160, the controller 46 places the valve 38 in the first condition to establish the first flow path from the gas generator 32 to the combustor 28. At 162, the controller 46 activates the squib 34. The squib 34 can be activated by sending an electrical signal to heat a bridge wire that ignites an explosive train in the squib 34. Activating the squib 34 causes ignition of the gas generator 32. At 164, the gas generator 32 burns to produce radical rich hot gas. At 166, the fuel and air mixture in the combustor 28 is ignited by the radical rich hot gas flowing from the gas generator 32 into the combustor 28 via the first flow path. In one example, 100% of the hot gas produced by the gas generator 32 is directed from gas generator 32 into the combustor 28 when the valve 38 is in the first condition. However, the valve 38 can be arranged to direct a desired percentage of gas from the gas generator 32 to the combustor 28 and also the accumulator 42 when the valve 38 is in the first condition (e.g., 80% of the gas directed to the combustor 28 and 20% of the gas directed to the accumulator 42).

Once the controller 46 detects that the fuel and air mixture has been ignited and that the scramjet 22 has been started, the control sequence moves to 168, where the controller 46 places the valve 38 in the second condition to establish the second flow path from the gas generator 32 to the accumulator 42. At 170, residual hot gas is stored in the accumulator 42. Residual hot gas is herein defined as any hot exhaust gas generated by the gas generator 32 that is not used at 166 to ignite the fuel and air mixture during cold start ignition of the scramjet engine 22. The residual hot gas flows from the gas generator 32 into the accumulator 42 via the second flow path. The gas generator 32 provides the accumulator 42 with a single, continuous charge of residual radical rich hot gas until all propellant in the gas generator 32 burns out. In one example, 100% of the hot gas produced by the gas generator 32 is directed from gas generator 32 into the accumulator 42 when the valve 38 is in the second condition. However, the valve 38 can be arranged to direct a desired percentage of gas from the gas generator 32 to the accumulator 42 and also the combustor 28 when the valve 38 is in the second condition (e.g., 80% of the gas directed to the accumulator 42 and 20% of the gas directed to the combustor 28).

If the controller 46 detects lean blowout or unstart of the scramjet 22 during operation, the sequence moves to 172, where the controller 46 places the valve 38 in the third condition to establish the third flow path from the accumulator 42 to the combustor 28. At 174, the fuel and air n in the combustor 28 is reignited by the radical rich residual hot gas flowing from the accumulator 42 into the combustor 28 via the third flow path.

It is contemplated that the ignition system 20 can be provided with sensors that are arranged to monitor operating conditions of the aircraft 100 to determine if conditions exist that may lead to blowout or unstart. The controller 46 may use this information to "ready" the ignition system 20 to allow for a faster reignition response time. Additionally, it is contemplated that the ignition system 20 can be provided with sensors that are arranged to monitor the level of residual hot gas stored in the accumulator 42. The controller 46 may use this information to estimate the number of reignition sequences that can be provided by the ignition system 20 and provide this estimation to the aircraft's control system, operator, or any other information destination. Additionally, it is contemplated that the controller 45 can be capable of controlling the valve 38 to direct the radical rich residual hot gas to a strategic injection location in the combustor when the operational environment and the flight profile of the vehicle 100 is likely to lead to lean blowout. The deposition of the radical rich residual hot gas can help with anchoring flame and sustaining combustion to prevent blowout while also increasing engine operability.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

I claim:

1. An ignition system for an engine, the ignition system comprising:
   an ignition source for producing hot gas;
   an accumulator for storing the hot gas; and
   a valve in fluid communication with the engine, the ignition source, and the accumulator, the valve selectively directing the hot gas from the ignition source to the engine to ignite the engine and selectively directing the hot gas from the ignition source to the accumulator to store the hot gas.

2. The ignition system according to claim 1, wherein the valve is arranged to selectively direct the hot gas from the accumulator to the engine.

3. The ignition system according to claim 1, wherein the engine is a jet engine.

4. The ignition system according to claim 3, wherein the jet engine is a dual mode ramjet or a scramjet.

5. The ignition system according to claim 1, wherein the ignition source includes a solid propellant gas generator.

6. The ignition system according to claim 5, wherein the ignition system includes a squib for igniting the solid propellant gas generator.

7. The ignition system according to claim 1, wherein the accumulator is thermally insulated.

8. A method of operating an engine comprising:
providing a valve that is in fluid communication with an ignition source, a hot gas accumulator, and the engine;
activating an ignition source to produce hot gas;
igniting the engine through use of the hot gas, the valve directing the hot gas from the ignition source to the engine; and
storing the hot gas in the hot gas accumulator after the step of igniting, the valve directing the hot gas from the ignition source to the hot gas accumulator.

9. The method according to claim 8, further comprising sustaining combustion by preventing lean blowout using the hot gas stored in the hot gas accumulator.

10. The method according to claim 8, further comprising reigniting the engine using the hot gas stored in the hot gas accumulator.

11. The method according to claim 10, including directing the hot gas from the hot gas accumulator to the engine with the valve during the reigniting of the engine.

12. The method according to claim 8, including thermally insulating the hot gas accumulator.

13. The method according to claim 8, including providing the ignition source with a squib and a solid propellant gas generator.

14. The method according to claim 8, wherein the valve is controlled to direct the hot gas from the ignition source to one of the hot gas accumulator and the engine depending on operational needs.

15. An ignition system for an engine, the ignition system comprising:
a squib;
a solid propellant gas generator for producing hot gas and ignitable by the squib;
an insulated hot gas accumulator for storing the hot gas; and
a three-way hot gas valve in fluid communication with the engine, the solid propellant gas generator, and the insulated hot gas accumulator, the three-way hot gas valve having a first condition establishing a first flow path from the solid propellant gas generator to the engine, a second condition establishing a second flow path from the solid propellant gas generator to the insulated hot gas accumulator, and a third condition establishing a third flow path from the insulated hot gas accumulator to the engine.

16. A vehicle comprising the ignition system of claim 15.

\* \* \* \* \*